2,957,814

PROCESS FOR MODIFYING POLYMERS AND PRODUCTS THUS OBTAINED

Warren Froemming Busse and Roger Arnold Hines, Wilmington, Del., assignors to E. I. du Pont de Nemours and Company, Wilmington, Del., a corporation of Delaware No Drawing. Filed July 12, 1956, Ser. No. 597,319

4 Claims. (Cl. 204—154)

This invention relates to an improved process for modifying polymers to increase strength and stiffness at temperatures above the crystalline melting point, and to improve resistance to solvents. It also relates to certain products obtained by the said process.

It has been well known for many years that polymeric materials become modified when subjected to bombardment with highly accelerated electrons or nuclear particles. Some polymers such as polymethyl methacrylate and polyisobutylene tend to degrade under such treatment, while others such as polyethylene, natural rubber, butadiene copolymers, polyvinyl chloride, polyamides (nylon), polyesters, and vinyl ($CH_2=CH-$) polymers in general, undergo cross-linking. It has also been known that graft polymers can be produced by subjecting certain polymers to the action of particular monomers while irradiating the mixture. It has also been known that various sources of free radicals such as organic peroxides, metal alkyl compounds and the like, have the effect of cross-linking polymers, in general, whether saturated or unsaturated.

The methods hereinabove described are effective but somewhat expensive for widespread use on a large scale because of the time factor involved in treating large quantities of polymer.

It has now been discovered in accordance with the present invention that certain monomeric materials described hereinbelow, exemplified by acrylonitrile, have the extraordinary property of accelerating the cross-linking of ethylene polymers by high energy particles thus increasing very greatly the speed with which cross-linked ethylene polymers can be made on a large scale. The conditions employed involve control of ratio of the weight of ethylene polymer to the weight of monomer, exposure time and intensity of radiation, as described below, to produce cross-links rapidly.

The polymers which can be treated by the process of this invention include normally solid homopolymers of ethylene as well as interpolymers of ethylene with vinylidene halides, or vinyl compounds. Among the latter may be mentioned vinyl hydrocarbons, such as propylene, butene-1, decene-1, isoprene, styrene; vinyl chloride, vinyl alkyl ethers, divinyl ethers, chloroprene, allyl esters, vinyl silanes, vinyl fluoride, vinyl esters of carboxylic acids, and the like.

The monomers which may be employed are nitriles having olefinic unsaturation in the alpha, beta-position, e.g. acrylonitrile, 1,4-dicyanobutenes, and vinylidene cyanide.

The radiation which is employed in the practice of this invention is composed of high energy particles, and by "high energy particle radiation" is meant an emission of highly accelerated electrons or nuclear particles, such as protrons, neutrons, alpha particles, deuterons, beta particles or the like, so that the said particle impinges on the polymer in contact with the monomer. The charged particles may be accelerated to high speeds by means of a suitable voltage gradient, using such devices as a resonant cavity accelerator, a Van de Graaff generator, a betatron, a synchrotron, cyclotron, or the like, as is well known to those who are skilled in the art. Neutron radiation may be produced by bombardment of selected light metal (e.g. beryllium) targets with high energy positive particles. In addition, particle radiation suitable for carrying out the process of the invention may be obtained from an atomic pile, or from radioactive isotopes or from other natural or artificial radioactive materials.

The expression "standard pass" as employed herein is defined to mean the passing of the sample through the beam of 2 mev. electrons at such a rate as to expose each square centimeter to 12.5 watts of radiation energy. For purposes of illustration, this quantity of energy is provided by a source of 250 microamps. of 2 mev. electrons bombarding 24 square inches of surface for about one second. A beam of half this current would require an exposure of 2 seconds. In rough approximation, one pass is equal to one mega-roentgen (one million roentgen equivalents physical, one roentgen equivalent physical being the amount of high energy particle radiation which results in energy absorption of 83.8 ergs per gram of water or equivalent absorbing material).

The high speed electrons penetrate the resin to a limited depth hence if it is desired to assure passage all of the way through the sample, it is necessary to employ samples which have a thickness of not more than about one-quarter to one-half inch. Otherwise, the sample beyond the range of the electrons will be relatively unexposed. On the other hand, where it is desired to produce an unmodified interior, encrusted in a cross-linked shell, there is no need for limiting the thickness of the sample.

A convenient method for practicing the invention is to conduct the polymer in film form, or other suitable physical form, continuously through the beam while maintaining the film in a closed system containing the monomer. The closed system can be maintained by liquid seals if desired. In those instances wherein relatively low amounts of cross-linking are adequate for the intended purposes the polymer can be irradiated in the form of fluff, and subsequently can be milled, extruded or otherwise shaped to the desired form, however, specimens thus treated do not have as high resistance to swelling in solvents or to flow at high temperatures.

In most instances, the radiation source is maintained at about 8 inches from the specimen undergoing treatment, but this is not especially critical. Where the beam of 250 microamperes of 2 mev. electron occupied a cross-section 3 inches wide and 8 inches long, a time passage through the beam at about 1 second for each pass gave an exposure to 12.5 watts per square centimeter.

The temperature during irradiation is suitably room temperature, but any temperature below the decomposition temperature of the polymer may be used. While pressure can be superatmospheric, ordinary pressures, close to one atmosphere are sufficient and are generally preferred. The partial pressure of the monomer may be decreased by adding a diluent inert gas, and this is advantageous in some circumstances, as where a very rapid polymerization in the gas phase may otherwise produce an explosion or produce undesired amounts of polymer from the monomer.

Two methods were used to determine the efficency of cross-linking during the irradiation. One was to put about 0.25 gram of the sample in the form of a film in 5 cc. of a solvent such as alpha chloronaphthalene and heat it for 4 hours at 150° C. If the sample was cross-linked sufficiently to form a coherent gel, the gel was removed from the liquid, then quickly wiped dry with filter paper, and weighed. The degree of swelling was indicated by the ratio of the liquid absorbed to the initial weight.

It is well known that the degree of swelling in a given gel system decreases as the number of cross links in the gel increases (Flory, Principles of Polymer Chemistry, Cornell University, Ithaca, N.Y., Chapter XIII-3, p. 576). Typical results for the swelling of a standard commercial polyethylene after various numbers of standard passes through the electron beam but without the monomeric modifier are shown in Table A, for purposes of comparison. Although this polyethylene forms the first trace of gel at about 2 standard passes, the gel structure formed at less than 4 or 5 standard passes is incomplete, and the gel which is formed is so weak that the sample partially dissolves and the gel tends to break up on handling it. However, at 5 or more standard passes the swelling data clearly show cross-linking. Above about 6 passes, strong coherent gels are formed, whose swelling is a measure of the degree of cross-linking. If the solvent or the type of polymer were changed, it is to be understood that the swelling might also change since the swelling also depends on the energy of interaction between the polymer and the swelling liquid.

TABLE A

*Swelling of polyethylene vs. irradiation with high-energy electrons, in absence of modifier*

| No. of standard passes: | Degree of swelling |
|---|---|
| 4 | 19 |
| 6 | 17.5 |
| 8 | 14.5 |
| 10 | 11.3 |
| 12 | 9.4 |
| 14 | 8.3 |
| 16 | 7.6 |
| 20 | 6.7 |
| 30 | 5.3 |

Another test that was used to measure the relative amounts of cross-linking in gels was to stretch a sample under a load of 10 p.s.i. in an oven whose temperature was raised 1° to 2°/min. The elongation was measured at various temperatures until the sample broke. It may be considered that the equilibrium modulus of a cross-linked elastic gel is proportional to the member of cross-links per unit volume (Flory, Principles of Polymer Chemistry, chapter XI). Hence the more the cross-linking, the lower will be the elongation at a given load and temperature.

Typical values for samples of commercial polyethylenes irradiated 4, 12, 18 and 24 standard passes in air are shown for purposes of comparison in Table B. Here the rapid increase in elongation between 100° and 125° C. is due to the melting of the crystallites. For the samples irradiated 12 to 24 standard passes the elongation stays roughly constant, or may even decrease slightly on raising the temperature from 125° to 150° or 175° C. Above 175° C. the elongation appears to again rise rapidly, usually just before failure.

TABLE B

*Elongation of irradiated polyethylene under a load of 10 p.s.i. at elevated temperatures*

| No. of Std. Passes | Test Temp., ° C. | Percent Elongation |
|---|---|---|
| 4 | 100 | Less than 2. |
| 12 | 100 | Less than 2. |
| 18 | 100 | Less than 2. |
| 24 | 100 | Less than 2. |
| 4 | 125 | Over 300. |
| 12 | 125 | 85. |
| 18 | 125 | 34. |
| 24 | 125 | 20. |
| 4 | 150 | Broke. |
| 12 | 150 | 90. |
| 18 | 150 | 34. |
| 24 | 150 | 20. |
| 4 | 175 | |
| 12 | 175 | 97. |
| 18 | 175 | 35. |
| 24 | 175 | 20. |
| 4 | 225 | Broke. |
| 12 | 225 | Broke. |
| 18 | 225 | 82. |
| 24 | 225 | 32. |

From the foregoing data it is apparent that, without use of a modifier the cross-linking of polyethylene by irradiation with high speed electrons requires a large number of standard passes.

In contrast with this, when the polyethylene is irradiated in the presence of the monomers herein disclosed, the amount of cross-linking, as measured by swelling or lowering of melt index, or other physical indicia, is considerably higher than that of polyethylene irradiated the same number of passes without an additive. This is illustrated in the following examples:

EXAMPLE 1

Polyethylene film was placed in a polyethylene bag with 0.1 part by weight of acrylonitrile per unit weight of film. On standing at room temperature for some hours all of the acrylonitrile was absorbed. Similarly, a sample of film containing 0.3 part by weight acrylonitrile per unit weight of polyethylene was prepared. The bags containing these films were placed on the moving table of a Van de Graaff generator, and subjected to bombardment with 2 mev. electrons. As a control a similar film, unprotected from the air, and without other modifier, was used. The irradiation dose was as specified in the following table, which records the effect of the irradiation on various physical properties. Also, at a given number of passes, the degree of swelling was far less than in Table A; for example, at 3 standard passes the degree of swelling was only 7.2. The stretching test (cf. Table B) also clearly indicated more cross-linking than in the control. The elongation was reduced to 1.5% at 100° C.; 0.5% at 150°; 0±0.2 at 200°; break temperature under 10 p.s.i. load, 221°.

TABLE 1

*Effect of electron bombardment on polyethylene in the presence of acrylonitrile*

| Property | Irradiated in presence of— | Irradiation dose (passes) | | |
|---|---|---|---|---|
| | | 0 | 0.4 | 3.0 |
| Inherent viscosity | Air | .37 | .42 | *(g) |
| | 10% ACN | | .8(g) | (g) |
| | 30% ACN | | (g) | (g) |
| Melt viscosity—150° C.—poises. | Air | 4.3×10$^5$ | 4.1×10$^5$ | |
| | 10% ACN | | 4.7×10$^5$ | |
| | 30% ACN | | 9.7×10$^5$ | |
| Compliance | Air | 13.5 | 11.5 | |
| | 10% ACN | | 49 | |
| | 30% ACN | | 54 | |
| Melt index | Air | 2.3 | 2.1 | 0.01 |
| | 10% ACN | | 0.4 | 0.00 |
| | 30% ACN | | 0.3 | 0.00 |
| Elmendorf tear | Air | 124 | 116 | 126 |
| | 10% ACN | | 119 | 74 |
| | 30% ACN | | 122 | 36 |

*(g) signifies that gel formation interfered with measurement of inherent viscosity.

As set forth in this table, the inherent viscosity data showed that irradiation with only 0.4 pass in the presence of 30% acrylonitrile (ACN) made the material insoluble, while about 3 passes were required to make the control insoluble, i.e. to give a gel instead of a solution. When only 10% ACN was present, the solution had an inherent viscosity (in α-chloronaphthalene at 125° C.) of 0.8, with a trace of gel in the solution, while the control irradiated 0.4 pass had a viscosity of 0.42.

In the same way, the melt viscosity at 150° C., measured with a rotating cone viscometer, was higher for the samples irradiated in the presence of 10% or 30% ACN than the control, evidently due to the cross-linking. The same effect was noted in the melt index tests. The compliance was higher for the samples irradiated 0.4 pass in the presence of ACN, as one would expect if there were more cross-linking.

Elmendorf tear results at 0.4 pass were about the same for the control and the samples irradiated 0.4 pass in the presence of ACN; but after irradiation for 3 passes, the ACN samples had much lower tear strength. This suggests that over-irradiation can have an adverse effect.

EXAMPLE 2

As in Example 1, 1,4-dicyanobutene (a mixture of 1,4-dicyanobutene-1 and 1,4-dicyanobutene-2) was added to polyethylene to the extent of 5% by weight, and the resulting films were irradiated for each of 2, 4, 6, 8, 10, and 12 passes. The resulting films were subjected to the swelling test described hereinabove (cf. Table A for control), and the degree of swelling was found to be significantly less than in the control.

Not all unsaturated compounds or polymerizable monomers will accelerate the cross-linking of the polyethylene. If the irradiation is done, for example, in the presence of methyl methacrylate, more irradiation is required to reduce the swelling to a given amount than is required when the polyethylene alone is irradiated.

The amount of irradiation needed to produce a gel structure of a given degree of cross-linking, or of swelling in solvents, depends in part on the initial molecular weight of the polymer. The lower the initial molecular weight, the more chance there is for part of the polymer to be in fringe structures that do not aid in holding the main gel structure together. Hence more irradiation is required to produce a gel structure of given properties with polymers of low molecular weight than for those of higher molecular weights. The distribution of molecular weights will also affect the change in gel properties with additional irradiation after the first gel is formed. This factor will, for example, make the relations between irradiation dose and degree of swelling different for linear and for branched polyethylenes of the same initial melt viscosity. However, the compounds disclosed here accelerate the cross-linking by irradiation in branched forms of polyethylene and also in linear polyethylenes.

In practicing the invention, the weight ratio of polymer to monomer can be kept within appropriate limits by employing an enclosed container in which the monomer is present in gas form. In a typical case, the quantity of monomer is quite small, e.g. about 0.02% to about 20% preferably 0.05 to 5%. Larger amounts may be used, but this results in excessive by-product formation of polymer from monomer. Generally there is no advantage in employing more than about 10% of the weight of monomer, based on the weight of polymer.

It should be understood that procedures illustrated for use with polyethylene can also be followed using the interpolymers of ethylene hereinabove disclosed, especially those having at least 50 mol percent of ethylene.

The present invention is highly useful in increasing the heat resistance of polyethylene or other resin coatings, especially in connection with armature windings and the like. In general the invention may be used in applications where the resin undergoing treatment is benefited by increasing the softening temperature thereof.

We claim:

1. A process for modifying a previously-existing, normally solid polymer of ethylene which comprises subjecting said polymer in contact with from 0.02% to 10% by weight of a monomeric cyanoalkene having olefinic unsaturation in the alpha, beta-position, to bombardment with a radiation dose of from about 0.4 to about 12 mega-roentgens of high energy ionizing radiation, whereby cross-links are created in said polymer at a rate faster than in the absence of said added monomer.

2. Process of claim 1 wherein said polymer is ethylene homopolymer.

3. Process of claim 2 wherein the said polymer is subjected to bombardment with high energy particle radiation in the presence of acrylonitrile.

4. A process for modifying previously-existing normally-solid ethylene polymer which comprises subjecting said polymer to bombardment with a radiation dose of from about 0.4 to about 12 mega-roentgens of high energy ionizing radiation in the presence of from 0.05% to 10%, by weight of said polyethylene, of added monomeric cyanoalkene having olefinic unsaturation in the alpha, beta-position, whereby cross-links are created in said polyethylene at a rate faster than in the absence of said added monomer.

References Cited in the file of this patent

FOREIGN PATENTS

| | | |
|---|---|---|
| 66,034 | France | Dec. 12, 1955 |
| | (4th addition to No. 1,079,401) | |
| 714,843 | Great Britain | Sept. 1, 1954 |

OTHER REFERENCES

Lawton et al.: "Nature," vol. 172, pp. 76, 77, July 11, 1953.

Radiation Applications "Radiation and the Polymer Industry," March 1955.

UNITED STATES PATENT OFFICE

CERTIFICATE OF CORRECTION

Patent No. 2,957,814　　　　　　　　　　　　　October 25, 1960

Warren Froemming Busse et al.

It is hereby certified that error appears in the printed specification of the above numbered patent requiring correction and that the said Letters Patent should read as corrected below.

Column 3, line 61, for "member" read -- number --.

Signed and sealed this 25th day of April 1961.

(SEAL)
Attest:

ERNEST W. SWIDER
Attesting Officer

DAVID L. LADD
Commissioner of Patents